(12) United States Patent
Nishida

(10) Patent No.: US 6,671,446 B1
(45) Date of Patent: Dec. 30, 2003

(54) OPTICAL WAVEGUIDE AND METHOD OF MANUFACTURING SAME

(75) Inventor: Naoki Nishida, Kusatsu (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/533,947

(22) Filed: Mar. 23, 2000

(30) Foreign Application Priority Data

Mar. 25, 1999 (JP) ............................................. 11-080964

(51) Int. Cl.[7] .............................. G02B 6/10; H01L 21/00
(52) U.S. Cl. ........................ 385/129; 385/130; 385/131; 385/132; 385/14; 438/29; 438/31
(58) Field of Search ................................. 385/114, 129, 385/130, 131, 132, 14, 115, 116; 65/385; 438/29, 31

(56) References Cited

U.S. PATENT DOCUMENTS

| 4,359,267 A | * | 11/1982 | Appel ...................... 427/163.2 |
| 4,373,780 A | * | 2/1983 | Lama .......................... 385/116 |
| 4,405,207 A | * | 9/1983 | Kay ............................. 359/642 |
| 4,547,038 A | | 10/1985 | Mori ....................... 250/235 X |
| 4,637,679 A | | 1/1987 | Funato ..................... 385/147 X |
| 4,958,893 A | | 9/1990 | Noguchi et al. ......... 362/259 X |
| 5,381,502 A | * | 1/1995 | Veligdan ..................... 385/115 |
| 5,479,550 A | * | 12/1995 | Nishioka et al. ............ 385/116 |
| 5,596,671 A | * | 1/1997 | Rockwell, III .............. 385/147 |
| 5,612,171 A | * | 3/1997 | Bhagavatula ................ 430/321 |
| 5,657,408 A | * | 8/1997 | Ferm et al. .................. 264/1.27 |
| 5,668,907 A | * | 9/1997 | Veligdan ...................... 385/120 |
| 5,719,976 A | | 2/1998 | Henry et al. .................. 385/50 |
| 5,727,013 A | | 3/1998 | Botez et al. ............. 372/45 X |
| 5,930,439 A | * | 7/1999 | Ojha et al. ................... 385/129 |
| 6,011,888 A | * | 1/2000 | Bell ............................ 385/116 |

FOREIGN PATENT DOCUMENTS

| JP | 54-7328 | 1/1979 | |
| JP | 7-84134 | 3/1995 | ............. 385/132 X |
| JP | 8-328051 | 12/1996 | ............... 385/14 X |
| JP | 10-282441 | 10/1998 | |

\* cited by examiner

*Primary Examiner*—Brian Healy
(74) *Attorney, Agent, or Firm*—Burns, Doane, Swecker & Mathis, LLP

(57) ABSTRACT

A plurality of top waveguides and bottom waveguides are formed on a substrate. The pitch of the light exit end of the top waveguide and the light exit end of the bottom waveguide at the light exit side of the substrate is narrower than the pitch of the light entrance end of the top waveguide and the light entrance end of the bottom waveguide at the light entrance side of the substrate. The light exit end of the waveguide on the light exit side of the substrate and the light exit end of the waveguide indicated by the dashed line are arranged as single rows forming a core row in two layers in a staggered layout. This optical waveguide produces ideally overlapping laser beam spots on the surface of a photosensitive body.

9 Claims, 7 Drawing Sheets

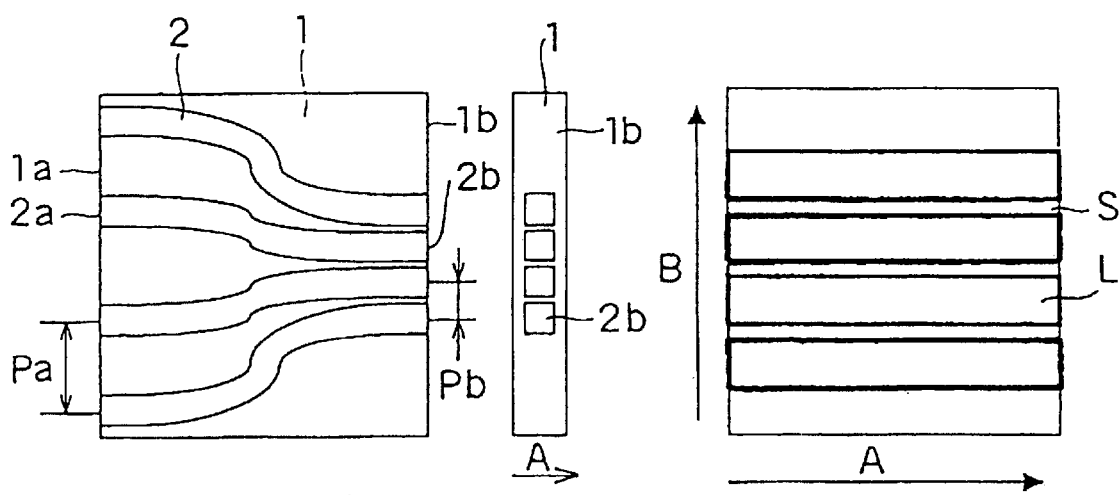
FIG.1(a) FIG.1(b) FIG.1(c)
PRIOR ART

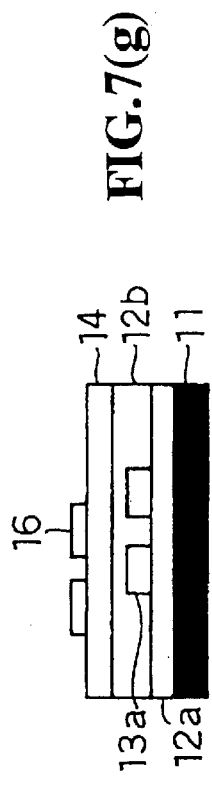
FIG.7(a)
FIG.7(b)
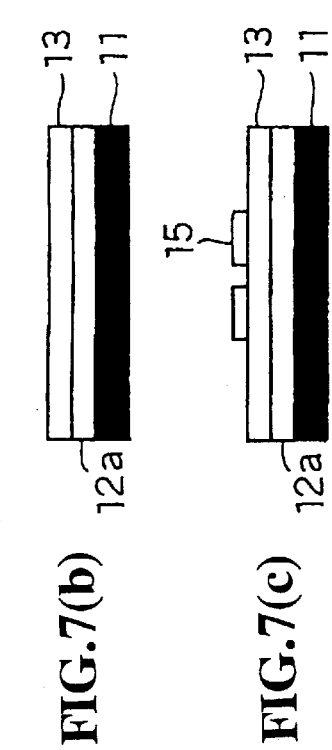
FIG.7(c)
FIG.7(d)
FIG.7(e)
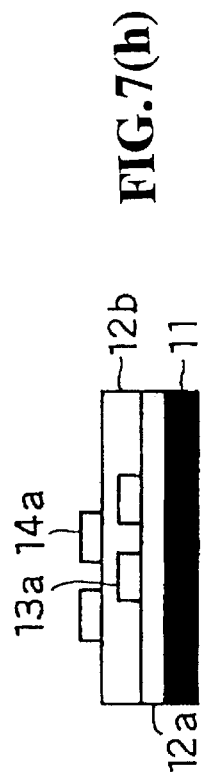
FIG.7(f)
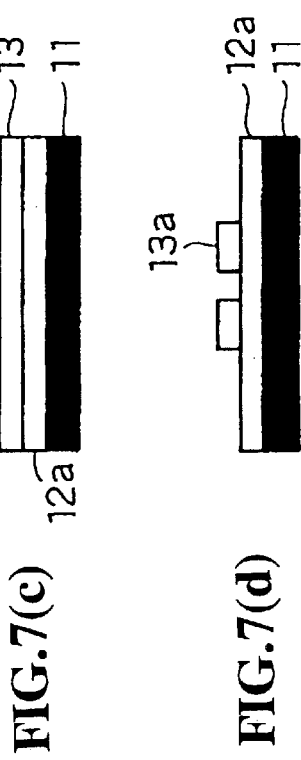
FIG.7(g)
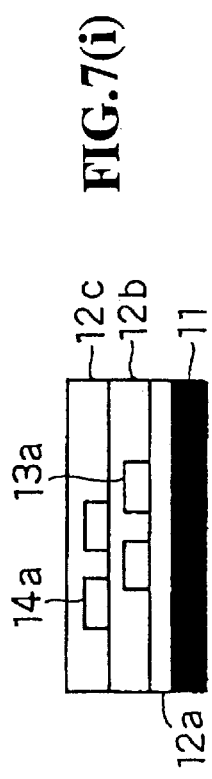
FIG.7(h)
FIG.7(i)

OPTICAL WAVEGUIDE AND METHOD OF MANUFACTURING SAME

CROSS-REFERENCE TO RELATED APPLICATIONS

The present application claims priority to Japanese Patent Application No. 11-80964 filed Mar. 25, 1999, the content of which is hereby incorporated by reference.

BACKGROUND OF THE INVENTION

1. Field of the Invention

The present invention relates to an optical waveguide, and specifically relates to a multi-layer optical waveguide constructed as a light source for a laser beam printer.

2. Description of the Related Art

There has been strong demand for increasing the speed of laser beam printers accompanying digitalization and the development of information networks in recent years. Increasing the speed of rotation of the polygonal mirror used for scanning has been proposed as one means of increasing the speed of the laser beam printer. It is difficult to increase the speed of rotation of the polygonal mirror beyond the current condition because the surface of the polygonal mirror may become distorted by the centripetal force when the number of rotations of the polygonal mirror approaches 50,000. Conventionally, the surface of a photosensitive body is scanned via a plurality of laser beams in order to increase the recording speed of laser beam printers.

Specific examples include Japanese Laid-Open Patent Application No. HEI 10-282441, and U.S. Pat. Nos. 4,637,679, 4,547,038, and 4,958,893 which disclose proposing or using constructions for regulating a plurality of laser beams at suitable spacing by optically deflecting a plurality of laser beams using a polarization beam splitter, half mirror, reflection of a prism surface and the like. However, these methods are disadvantageous in that alignment of the beams becomes difficult when there are many laser beams, the size of components increases, and cost becomes excessive. For these reasons, it is extremely difficult to increase the speed beyond current conditions.

Methods of construction using a plurality of laser light sources arranged at very small pitch, the so-called multi-light source method, is desirable. This method includes the so-called array laser method of forming laser diodes on a substrate as a multi-laser light source, the method of light emitted from optical fiber as a secondary light source, and a method using an optical waveguide to reduce the pitch on the exit side to be narrower than the entrance side, as disclosed in Japanese Laid-Open Patent No. SHO 54-7328.

When considering the state of image formation on the surface of a photosensitive body in methods using array lasers, the pitch of the arranged laser diodes is desirably at very small spacing of less than 100 $\mu$m so as to have a plurality of laser beam spots in sufficient proximity. However, forming laser diodes on a substrate at such a fine pitch is difficult due to disadvantageous heat generation. For this reason, other methods using optical fiber or optical waveguides are deemed effective.

When a plurality of laser beams are used, the laser beam spots on the surface of the photosensitive body must mutually overlap so as to record without gaps on the surface of the photosensitive body. At this time, the required overlap on the surface of the photosensitive body may not be obtained even if, for example, an optical waveguide is used to narrow the pitch on the light exit side when does not overlap even though the core pitch of the light exit edge is reduced to the lowest limit.

The reason for this situation is that the beam spot diameter is thinned and reduced when the laser beam spot pitch on the photosensitive surface is also reduced using a reducing optical system. Although types which use optical fiber rather than optical waveguides have been considered, types using optical waveguides characteristically provide greater freedom from the perspective of narrowing a plurality of optical paths.

FIGS. 1(a)–1(c) schematically show the construction of a conventional light waveguide for narrowing the pitch on the light exit side, and the scan line produced thereby. FIG. 1(a) shows a plan view, FIG. 1(b) shows the light exit side at the right side of the plan view. FIG. 1(c) shows the state of the scan line recording on the photosensitive body surface. As shown in FIG. 1(a), a conventional optical waveguide is formed by a plurality of optical waveguides 2 on a substrate 1. The pitch Pb of the light exit end 2b of the waveguide 2 at the light exit side 1b of the substrate 1 is narrower and has a tighter structure than the pitch Pa of the light entrance end 2a of the waveguide 2 at the light entrance side 1a of the substrate 1. As shown in FIG. 1(b), the light exit end 2b of the waveguide 2 is arranged as a single core row on the light exit side 1b of the substrate 1.

When scanning in the main scan direction indicated by the arrow A using the aforesaid conventional optical waveguide, a plurality of connected scan lines L are obtained in the main scan direction, as shown in FIG. 1(c), but a gap S is generated between each scan line L in the subscan direction indicated by the arrow B. The state of the scan line shown in FIG. 1(c) is shown viewed from the photosensitive body surface side.

To counteract these disadvantages, there is known art which does not use optical waveguides and collimates laser beams emitted from each laser beam light source via individual micro lenses so as to overlap the laser beam spots, such as disclosed in U.S. Pat. No. 5,737,300. However, such micro lenses are difficult to manufacture and position, and disadvantageously increase costs.

SUMMARY OF THE INVENTION

An object of the present invention is to eliminate the previously described disadvantages.

Another object of the present invention is to provide an optical waveguide and manufacturing method capable of ideally overlapping laser beam spots on a photosensitive body surface.

These and other objects are attained by providing an optical waveguide, comprising a plurality of layers; and a plurality of cores provided in each of the at least two of the plurality of layers, and arranged with staggered exits.

These objects are further attained by a method for manufacturing the optical waveguide, comprising the steps of: forming a bottom surface clad layers on a top surface of a substrate; forming a bottom core on the bottom clad layers; forming an overclad to protect the bottom core and the top surface of the bottom clad layers; polishing the top surface of the overclad; and forming a top core on the polished overclad.

The present invention produces an ideally overlapped laser beam spots on the surface of a photosensitive body via a simple arrangement and simple optical system. Furthermore, the generation of gaps in the scan line is prevented by multiple light sources.

If a core is laminated after the top surface of the overclad is polished to flatness, defects and the like of the core on the overclad can be prevented.

The invention itself, together with further objects and attendant advantages, will be best understood by reference to the following detailed description taken in conjunction with the accompanying drawings.

BRIEF DESCRIPTION OF THE DRAWINGS

FIGS. 1(a)–1(c) schematically show the construction of a conventional optical waveguide and its scan line.

FIGS. 7(a)–7(i) schematically show the specific manufacturing process of the optical waveguide of the present invention.

In the following description, like parts are designated by like reference numbers throughout the several drawings.

DETAILED DESCRIPTION OF THE PREFERRED EMBODIMENTS

Figures 2A, 2B, 2C:
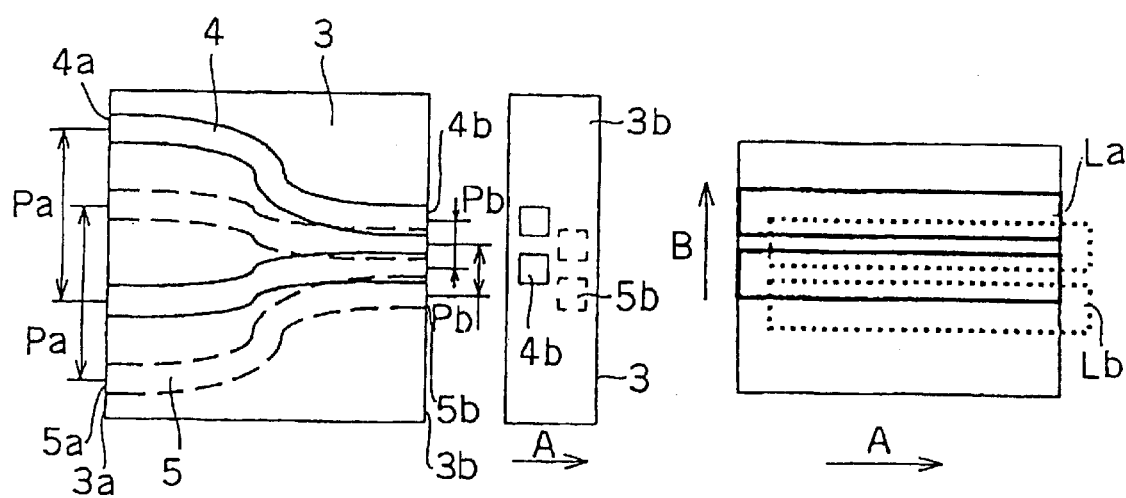
FIGS. 2(a)–2(c) are schematic illustrations of the construction of the optical waveguide of an embodiment of the present invention and its scan line.

The embodiments of the present invention are described hereinafter with reference to the accompanying drawings. FIGS. 2(a)–2(c) schematically show the construction of the optical waveguide of an embodiment of the present invention, and its scan line. FIG. 2(a) is a plan view, and FIG. 2(b) shows the light exit side on the right side of the drawing. FIG. 2(c) shows the state of the scan line recorded on the photosensitive body surface.

As shown in FIG. 2(a), the optical waveguide of the present embodiment comprises a plurality of top waveguides 4 indicated by the solid lines on the substrate 3, and bottom waveguides 5 indicated by the dashed lines. The pitch Pb of the light exit end 4b of the top waveguide 4 and the light exit end 5b of the bottom waveguide 5 at the light exit side 3b of the substrate 3 is narrower and has a tighter structure than the pitch Pa of the light entrance end 4a of the top waveguide 4 and the light entrance end 5a of the bottom waveguide 5 at the light entrance side 3a of the substrate 3. As shown in FIG. 2(b), at the light exit end 3b of the substrate 3, the light exit end 4b of the waveguide 4 indicated by the solid lines and the light exit end 5b of the waveguide 5 indicated by the dashed lines are arranged as single rows forming a core row in two layers in a staggered layout.

When scanning in the main scan direction indicated by the arrow A using the optical waveguide of the present embodiment, a plurality of consecutive scan lines Ls represented by the solid lines in the main scan direction, and a plurality of consecutive scan lines Lb represented by the overlapped dashed lines are obtained, such that there are no gaps in the subscan direction indicated by the arrow B, as shown in FIG. 2(c). The state of the scan line shown in FIG. 2(c) is the state viewed from the photosensitive body surface side.

The dots recorded in the main scan direction are shifted alternatingly at La and Lb. The recorded dots may be managed by generating a start-of-scan (SOS) signal for each scan line, or other scan line signals may be controlled based on the scan line SOS signal by increasing the manufacturing precision between each layer.

Figure 3:
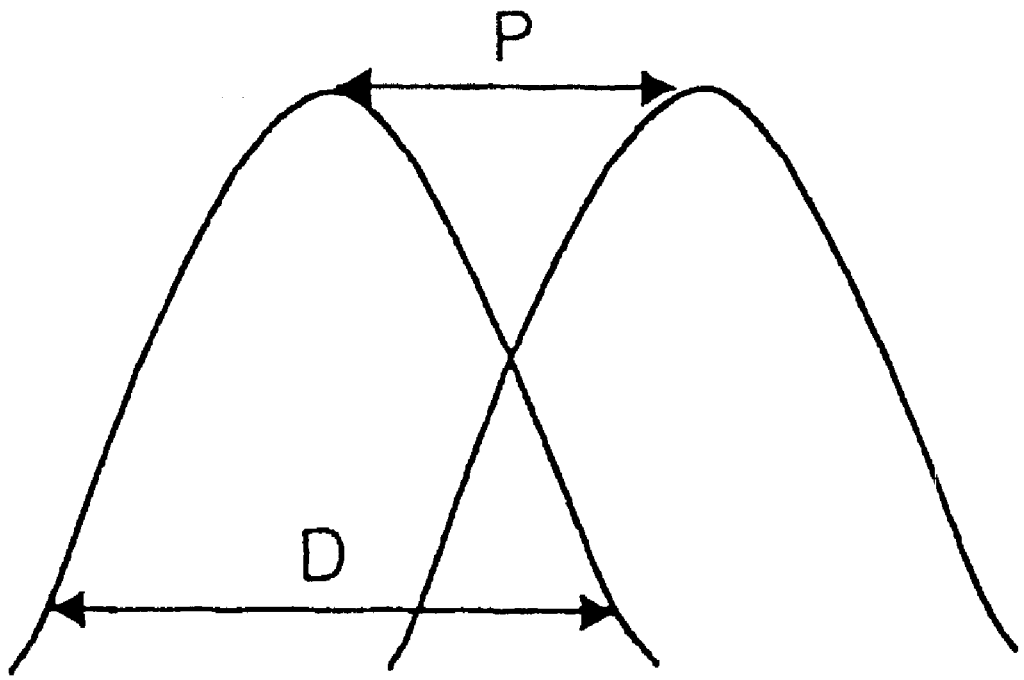
FIG. 3 shows the distribution of laser beam power on the photosensitive body surface.

FIG. 3 schematically shows the power distribution of the laser beams on the surface of the photosensitive body. In FIG. 3, the positional relationship of the beams is represented in the lateral direction, and the power of the beams is represented in the vertical direction. In the present embodiment, when the recording speed of the laser beam printer is 600 dpi, and the pitch P between the laser beams mutually overlapping on the surface of the photosensitive body is P=42 µm, the laser beam spot diameter D on the surface of the photosensitive body becomes D=60 µm, and the relationship (1) shown below obtains.

$$P/D=0.7 \tag{1}$$

The laser beam spot diameter is defined at the major diameter at which the optical power at the spot center becomes $1/e^2$.

Figure 4:
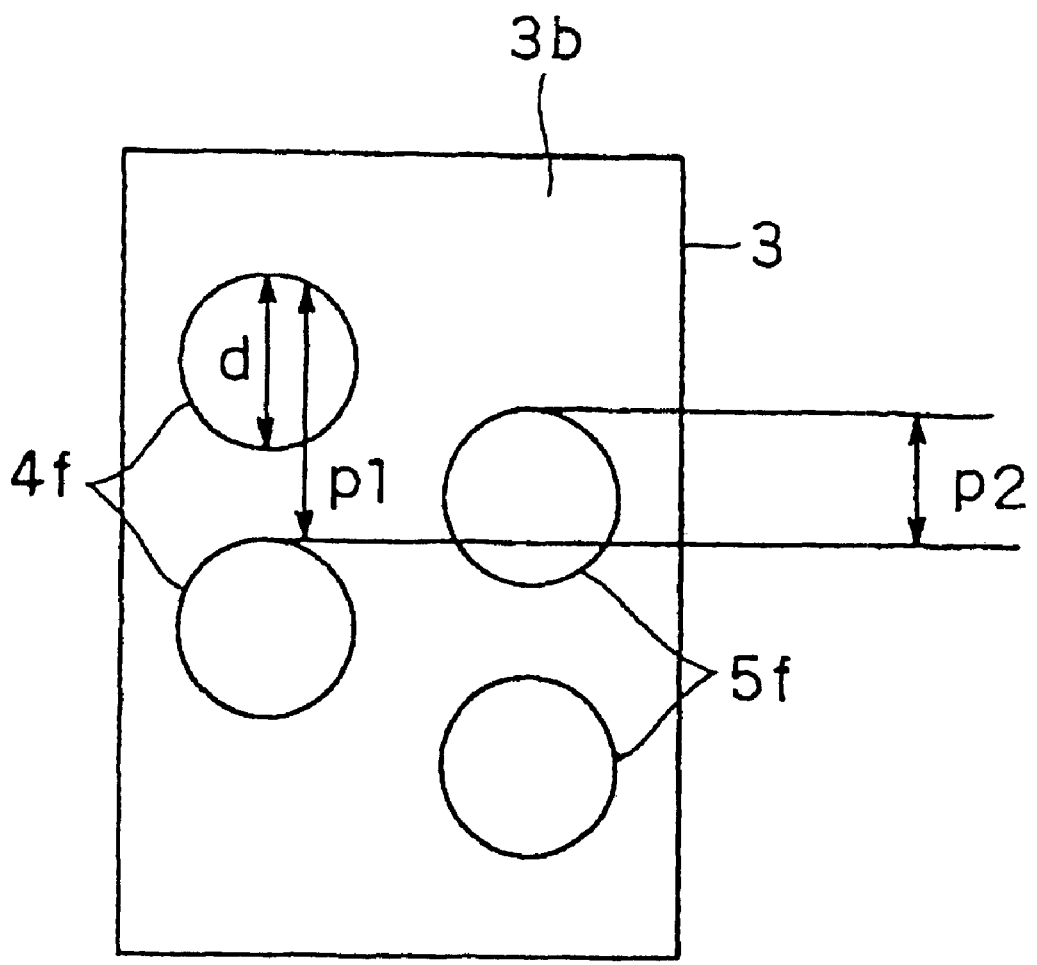
FIG. 4 is a schematic illustration of the mode field layout of the light exit end of the optical waveguide of the embodiment.

FIG. 4 schematically shows the layout of the mode field of the light exit end of the optical waveguide of the present embodiment. The mode field is the field effused by the light exiting the core of the waveguide. In optical design, the size of the effusion, i.e., the diameter of the mode field, is more important than the core diameter. As shown in FIG. 4, in the present embodiment, when the diameter of the mode field 4f of the top waveguide 4 is set at d=8 µm at the light exit end 3b of the optical waveguide 3, the period, i.e., the pitch, of the layout of the mode field 4f is set at p1=11.4 µm.

Conversely, the period of the layout and diameter of the mode field 5f of the bottom waveguide 5 is identical to the mode field 4f and arranged in staggered layout such that one of the mode fields 5f is staggered relative to the center between the mode fields 4f. In this way, the period of the effective layout of the mode fields, i.e., the pitch between the mode fields 4f and 5f becomes p=5.7 µm, and the relationship (2) below obtains, satisfying a condition similar to relationship (1) above.

$$p2/d \cong 0.7 \tag{2}$$

Figure 5:
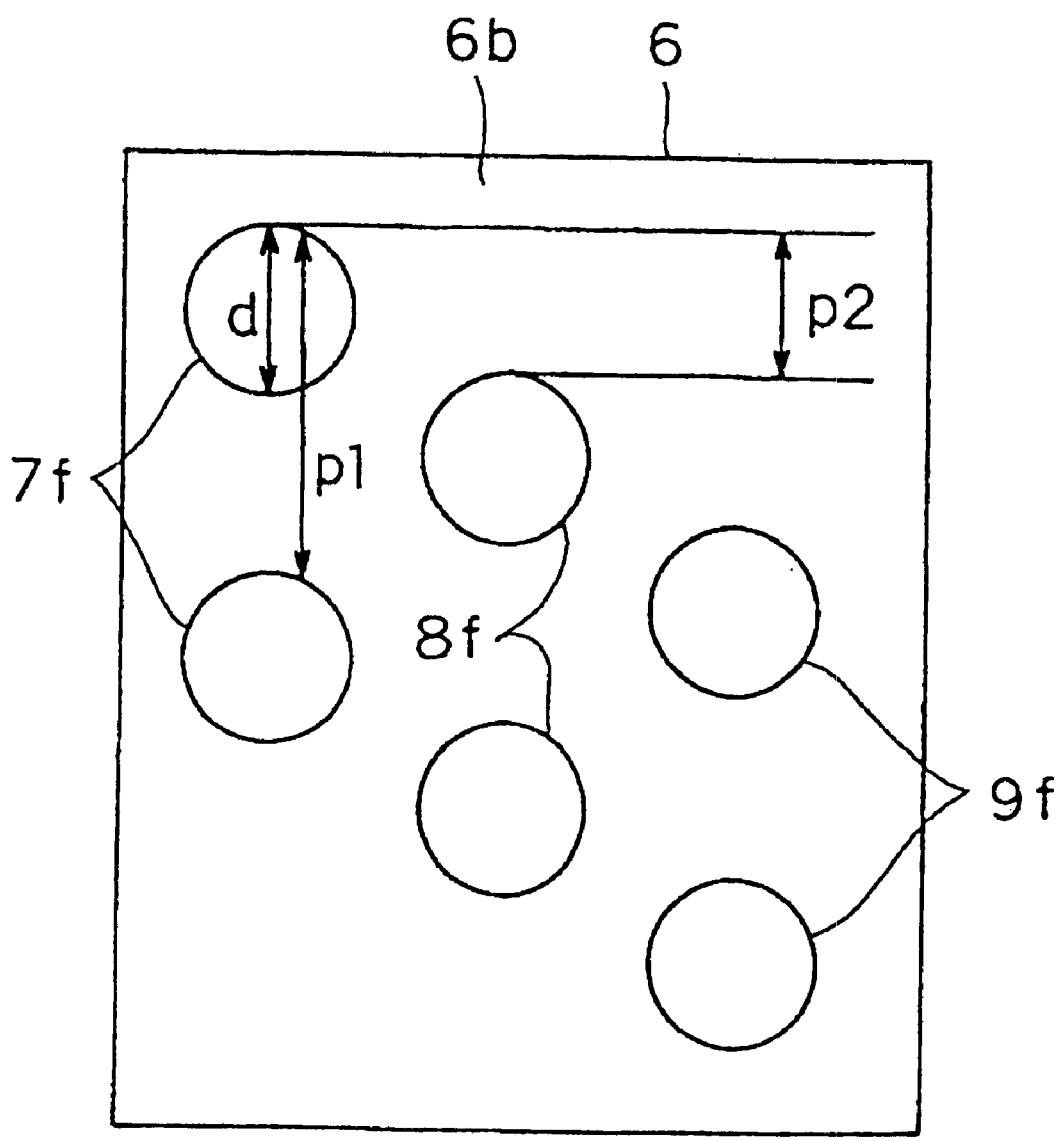
FIG. 5 is a schematic illustration of the mode field layout of the light exit end of the optical waveguide of another embodiment.

FIG. 5 schematically shows the layout of the mode field of the light exit end of the optical waveguide of another embodiment. As shown in FIG. 5, in the present embodiment, the waveguide is formed in three layers. When the diameter of the core of the waveguide is set so as to satisfy a single mode condition, and the propagated light wavelength λ=0.78 µm and the refractive index difference Δn=55%, the mode field diameter becomes d≅3 µm. The spacing between mode field in each layer must be approximately 3 µm in order to prevent crosstalk between waveguides, i.e., light leakage between analogous cores.

At this time, when the diameter of the mode field 7f of the first layer is set at d=3 µm, the period, i.e., the pitch, of the layout of the mode field 7f is set at p1=6.3 µm. Conversely, if the diameter and period layout of the mode field 8f of the second layer is set identically to the mode field 7f with a pitch p2=2.1 µm between the mode fields 7f and 8f, and the mode fields 9f of the third layer are similarly set, the relationship (3) below obtains, and satisfies a condition similar to relationship (1).

$$p2/d=0.7 \tag{3}$$

Moreover, the waveguide can be constructed with a multi-layered structure pursuant with the description above.

Figure 6:
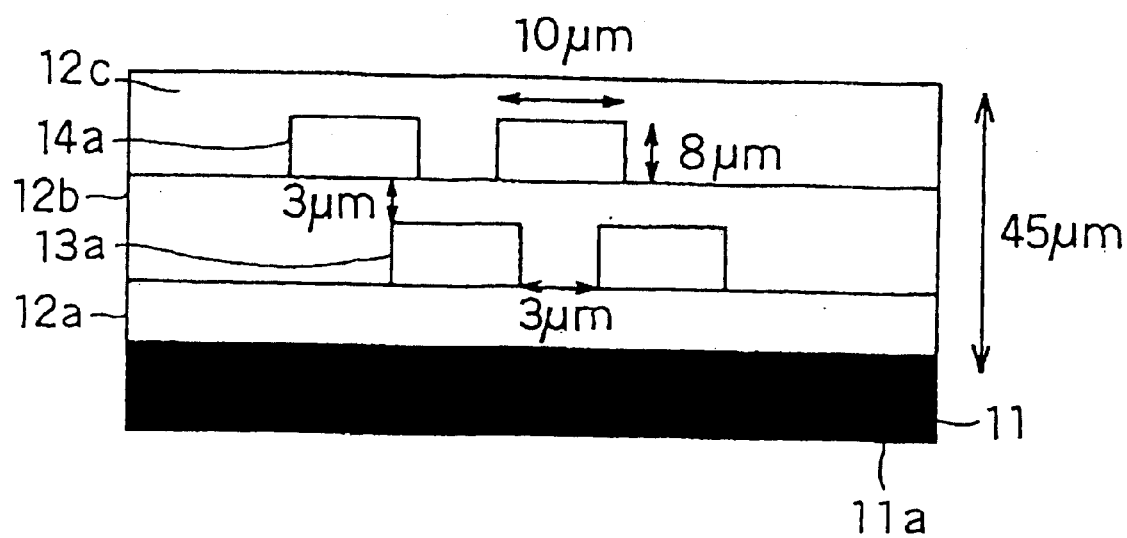
FIG. 6 schematically shows the specific construction of the optical waveguide of the present invention from the light exit side.

FIG. 6 schematically shows the specific structure of the optical waveguide of the present invention viewed from the light exit side. As shown in FIG. 6, on the surface of a substrate of glass, silicon or the like are formed sequentially from the bottom a bottom clad layer 12a, intermediate clad layer 12b, and a top clad layer 12c. The intermediate clad layer 12b is provided with a bottom core 13a. The top clad layer 12c is provided with a top core 14a. The bottom core 13a and the top core 14a are staggered in layout. These layers are formed using glass, polyimide resin, epoxy resin or the like as materials. The dimensions of each part in the illustrated example follows: the thickness of all clad layers is 45 μm, the spacing between the bottom core 13a is 3 μm, the spacing between the bottom core 13a and the top core 14a is 3 μm, the width of each core is 10 μm, and thickness is 8 μm.

FIGS. 7(a)–7(i) schematically show specifics of the manufacturing process of the optical waveguide of the present invention. The method of forming the layers using the aforesaid materials include flame volume method, CVD, and spattering in the case of glass materials, and spin coating method in the case of polymers such as polyimide and the like. Methods using ultraviolet light curing resins and other methods also may be used. Specific processes first from the bottom clad layer 12a on the top surface of the substrate 11, as shown in FIG. 7(a). Then, the bottom core layer 13 is formed on the top surface of the bottom clad layer 12a, as shown in FIG. 7(b). Thereafter, a resist 15 is formed on the top surface of the bottom core layer 13 by photolithography only on the areas desired to remain, as shown in FIG. 7(c).

In the state shown in FIG. 7(c), when the bottom core layer 13 is etched by dry etching, the remaining parts become the bottom core 13a, as shown in FIG. 7(d). Then, an intermediate clad layer 12b (overclad) is formed on the top surface of the bottom clad layer 12a to protect the bottom core 13a, as shown in FIG. 7(e). Next, a top core layer 14 is formed on the top surface of the intermediate clad layer 12b, as shown in FIG. 7(f). Thereafter, a resist 16 is formed on the top surface of the top core layer 14 via photolithography only on the areas desired to remain, as shown in FIG. 7(g).

In the state shown in FIG. 7(g), when the top core layer 14 is etched by dry etching, the remaining parts become the top core 14a, as shown in FIG. 7(h). Then, a top clad layer 12c (overclad) is formed on the top surface of the intermediate clad layer 12b to protect the top core 14a, as shown in FIG. 7(i). The optical waveguide of the present invention is manufactured by the aforesaid process. The process is similar when three or more cores are formed.

Since the top part of the bottom core 13a protrudes when the intermediate clad layer 12b is formed as shown in FIG. 7(e), there is concern of incurring defects and the like on the top core 14a thereby. In order to prevent such occurrence, the top surface of the intermediate clad layer 12b may be polished to flatness before the top core 14a is formed. In the multi-layer optical waveguide of the present invention, the substrate may warp due to the stress caused by the extreme thickness of the clad layers. To prevent such an occurrence, countermeasures may be taken such as forming a dummy clad layer of similar thickness on the back side of the substrate 11 (shown in FIG. 6 as 11a).

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An optical waveguide, comprising:
   a plurality of layers; and
   a plurality of cores provided in each of at least two of said plurality of layers, and arranged with exits placed regularly on alternating sides of a boundary line between said at least two of said plurality of layers, wherein an imaginary line interconnecting central points of each of said exits placed regularly on said alternating sides of said boundary line is a symmetric zig-zag line of uniform pitch.

2. An optical waveguide comprising:
   a plurality of layers;
   a plurality of cores provided in each of at least two of said plurality of layers, and arranged with exits placed regularly on alternating sides of a boundary line between said at least two of said plurality of layers;
   a substrate on which said plurality of layers are formed; and
   a clad layer that is formed on the back side of said substrate.

3. A method for manufacturing the optical waveguide, comprising the steps of:
   forming a bottom clad layer on a top surface of a substrate;
   forming a bottom core on the bottom clad layer;
   forming an overclad to protect the bottom core and the top surface of the bottom clad layer;
   polishing the top surface of the overclad; and
   forming a top core on the polished overclad.

4. A method for manufacturing according to claim 3, further comprising:
   forming a clad layer on the back side of the substrate.

5. An optical waveguide, comprising:
   a substrate;
   a bottom clad layer which is formed on a top surface of said substrate;
   a plurality of bottom cores which are formed on the bottom clad layer;
   an overclad for protecting said plurality of bottom cores and the top surface of said bottom clad layer, the top surface of said overclad being polished; and
   a plurality of top cores which are formed on the top surface of said overclad.

6. An optical waveguide according to claim 5, further comprising:
   a clad layer on the back side of said substrate.

7. An optical waveguide according to claim 5, wherein said bottom cores and said top cores are arranged with staggered exits.

8. An optical waveguide comprising:
   a plurality of layers;
   a plurality of cores provided in each of at least two of said plurality of layers, and arranged with exits placed regularly on alternating sides of a boundary line between said at least two of said plurality of layers;
   wherein a pitch of light exit ends of said plurality of cores is narrower than a pitch of light entrance ends of said plurality of cores in each of said at least two layers, and wherein light exit ends of said plurality of cores in one layer are staggered relative to light exit ends of said plurality of cores in an adjacent layer.

9. An optical waveguide, comprising:
   a substrate;
   a plurality of layers located on one side of said substrate;
   a plurality of cores provided in each of at least two of said plurality of layers; and
   a clad layer that is formed on a side of said substrate opposite to said plurality of layers.

* * * * *